United States Patent [19]

Kastuhara et al.

[11] Patent Number: 5,332,236
[45] Date of Patent: Jul. 26, 1994

[54] SEALING MECHANISM FOR A ROTARY ACTUATOR

[75] Inventors: Nobuo Kastuhara, Nara; Norizi Maeda; Motohiro Hashimoto, both of Wakayama; Fumio Iwamoto, Hyogo, all of Japan

[73] Assignee: Sumitomo Precision Products, Co., Ltd., Amagasaki, Japan

[21] Appl. No.: 925,118

[22] Filed: Aug. 6, 1992

[30] Foreign Application Priority Data

Aug. 26, 1991 [JP] Japan .................. 3-075736

[51] Int. Cl.⁵ ............................................. F16J 9/06
[52] U.S. Cl. ................................. 277/165; 277/81 P; 277/79; 277/205; 92/125
[58] Field of Search ................ 277/92, 165, 27, 70, 277/79, 177, 205, 215, 81 P; 92/125

[56] References Cited

U.S. PATENT DOCUMENTS

| | | | |
|---|---|---|---|
| 2,456,529 | 12/1948 | Naab | 277/165 |
| 3,128,679 | 4/1964 | Trandle | 92/165 |
| 3,140,902 | 7/1964 | Herbst | 277/188 R |
| 3,277,796 | 10/1966 | Wessel et al. | 277/165 |
| 4,151,999 | 5/1979 | Ringel et al. | 277/165 |
| 4,471,967 | 9/1984 | Meyer | 277/165 |
| 4,615,261 | 10/1986 | Meijer | 277/165 |
| 4,774,875 | 10/1988 | Amshoff, III | 277/81 R |
| 4,796,858 | 1/1989 | Kabel | 277/165 |
| 4,817,966 | 4/1989 | Borowski | 277/3 |
| 4,928,978 | 5/1990 | Shaffer et al. | 277/25 |
| 5,066,027 | 1/1991 | Edlund | 277/165 |

FOREIGN PATENT DOCUMENTS 0471341 9/1937 United Kingdom ............... 277/165

Primary Examiner—William A. Cuchlinski, Jr.
Assistant Examiner—Daniel G. DePumpo
Attorney, Agent, or Firm—Armstrong, Westerman, Hattori, McLeland, & Naughton

[57] ABSTRACT

This sealing mechanism is provided with a cap in an overall sectional configuration of a cramp iron which is made from a synthetic resin, and a resilient sealing body in an overall sectional configuration of a cramp iron. An inner surface of the cap is formed with an inserting groove in which the resilient sealing body is fitted. When the resilient sealing body is fitted in the inserting groove in the cap, this sealing body is partially protruded from inner surface of the cap. The cap is also formed with longitudinal lubricating slots on the outer surface thereof. Moreover, both side surfaces of the cap are provided with a plurality of notches at predetermined regular intervals of place which extend from the outer surface of the cap to the inner surface thereof.

12 Claims, 6 Drawing Sheets 5,332,236

SEALING MECHANISM FOR A ROTARY ACTUATOR

BACKGROUND AND SUMMARY OF THE INVENTION

The present invention relates to improvements in a sealing mechanism for a rotary actuator.

In general, as shown in FIG. 12, a rotary actuator is provided with a rotor (shaft) a and a casing b having said rotor inserted therein, and is arranged to have the rotor a or the casing b pivoted about the axis thereof with respect to each other.

The rotary actuator as illustrated in FIG. 12 will now be described in more detail.

The rotor a has a pair of protrusions d, d located on the outer circumferential surface c thereof so as to be symmetrical about the axis of thereof, and also, the inner circumferential surface of the casing b is provided with a pair of protrusions which are symmetrically located about the axis of the rotor.

With such an arrangement, cylindrical chambers g1, g2, g3 and g4 are formed between the rotor a and the casing b. The cylindrical chambers g1 and g3 are internally placed under the same pressure of working fluid, while at the same time, the cylindrical chambers g2 and g4 are also put in the same fluid pressure. For example, if with the casing b fixed, the cylindrical chambers g1 and g3 are supplied with working fluid, and at the same time, the cylindrical chambers g1 and g4 have their internal working fluid discharged from them, then the rotor a is rotated in the direction of the arrow head i. Inversely, if the cylindrical chambers g2 and g4 are internally fed with fluid pressure, and at the same time, the cylindrical chambers g1 and g3 have their internal fluid pressure discharged from them, the rotor is rotated in the direction of the arrow head i.

The foregoing conventional arrangement and operation of the rotary actuator necessitated the provision of grooves k in the protrusions d, d and in the protrusions f, f to fit a sealing material m into each groove k so that a sealed condition is achieved between every two adjacent ones of the cylindrical chambers g1, g2, g3 and g4.

Each groove k is in an overall sectional configuration of a cramp iron, as shown in FIG. 13. On the other hand, a conventional sealing material is made by cutting an O-ring so as to have a bar-shaped configuration, and is inserted along and into the groove k of the foregoing sectional configuration. For this reason, as shown in FIG. 13, at corner portions n, n of the groove k, the conventional sealing material was difficult to bend at right angles and to adapt precisely to the internal shape of the groove k. This hindered the complete sealing of the groove, and caused fluid leakage.

It is therefore an object of the present invention to provide improvements in the sealing mechanism of the rotary actuator, in which fluid leakage is minimized, and the relative smooth rotation of the rotor and the casing about the axis to each other can be achieved.

BRIEF DESCRIPTION OF THE DRAWINGS

The present invention will now be described with reference to the accompanying drawings, in which.

DETAILED DESCRIPTION OF THE PREFERRED EMBODIMENTS

Some preferred embodiments of the sealing mechanism according to the present invention will now be described in detail with reference to the accompanying drawings.

Figure 5:
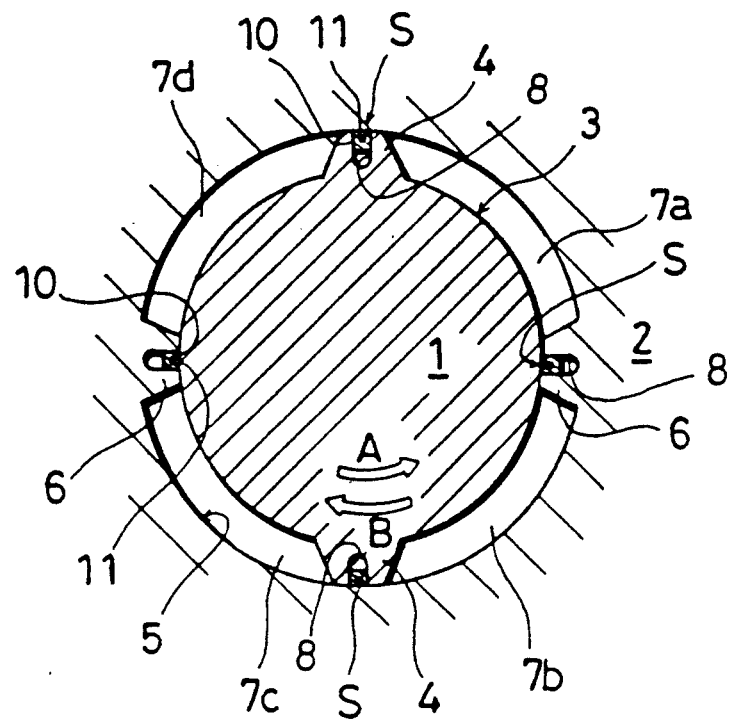
FIG. 5 is a sectional view of a rotary actuator.
Figure 6:
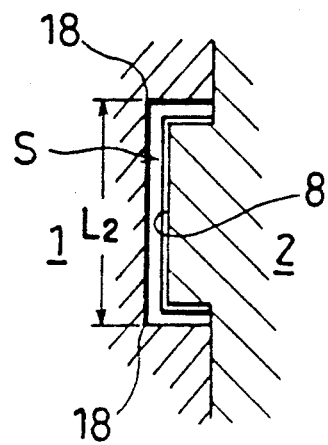
FIG. 6 is a sectional view of a principal portion of the rotary actuator of FIG. 5.

FIGS. 5 and 6 respectively show a rotary actuator in which the sealing mechanisms S according to the present invention is used. This rotary actuator is provided with a rotor 1 and a casing 2 in which said rotor 1 is inserted, and said actuator is so arranged that the rotor 1 or the casing 2 pivots about the axis thereof. This arrangement of the rotary actuator is achieved as described hereinafter.

An outer circumferential surface 3 of the rotor 1 is provided with a pair of protrusions 4, 4 which are located so as to be symmetric with respect to the axis thereof. Also, an inner circumferential surface 5 of the casing 2 has a pair of protrusions 6, 6 symmetrically located with respect to the axis thereof. Thus, four cylindrical chambers 7a, 7b, 7c and 7d are formed between the rotor 1 and the casing 2.

The cylindrical chambers 7a, 7c are internally placed under the same pressure of working fluid, while at the same time, the cylindrical chambers 7b, 7d are put in the same internal pressure of working fluid. If with the casing 2 fixed, the cylindrical chambers 7a and 7c are internally fed with working fluid, and at the same time, the cylindrical chambers 7b and 7d have their internal working fluid discharged therefrom, then the rotor 1 is rotated in the direction of the arrow head A. Inversely, if the cylindrical chambers 7b, 7d are supplied with the working fluid, while at the same time, the cylindrical chambers 7a, 7c have their internal working fluid discharged from them, the rotor 1 is rotated in the direction of the arrow head B.

Also, each of the protrusions 4,4 and 6,6 is formed with a groove 8, and the sealing mechanism according to the present invention is fitted in this groove 8 to thereby seal each cylindrical chamber 7a, 7b, 7c, 7d against leakage of the internal working fluid thereof. The groove is formed in a configuration of a cramp.

Figure 2:
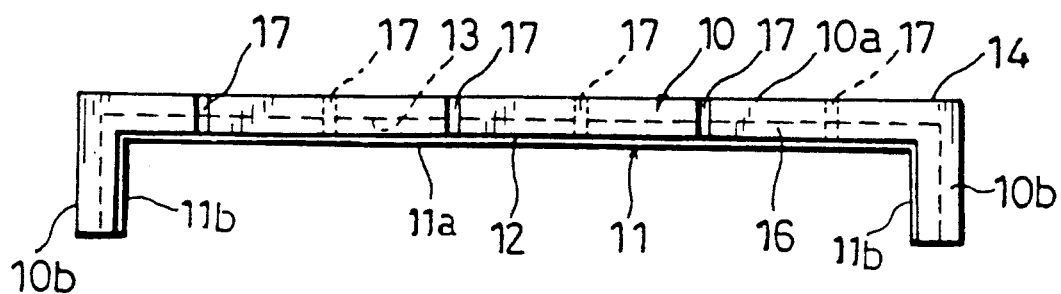
FIG. 2 is a side view of the overall arrangement of the sealing mechanism of FIG. 1.

Thus, each sealing mechanism S is provided with a cap means 10 in an overall sectional configuration of a cramp, and a resilient sealing body 11 in an overall sectional configuration of a cramp, as shown in FIG. 2.

The cap means 10 is made from fluorocarbon resin such as polytetrafluoroethylene or the like, or a synthetic resin such as polyacetal, polyimide, polyethylene of superhigh molecular weight or the like, and this cap means 10 comprises a body portion 10a and leg portions 10b, 10b which are bent at right angles on the end portions of said body portions 10a. The end portions of the leg portions 10b, 10b are rounded as shown in FIG. 4.

An inner surface 12 of the cap means 10 is provided with an inserting groove 13 of a substantially rectangular sectional shape which has the resilient sealing body 11 fitted thereinto.

Figure 3:
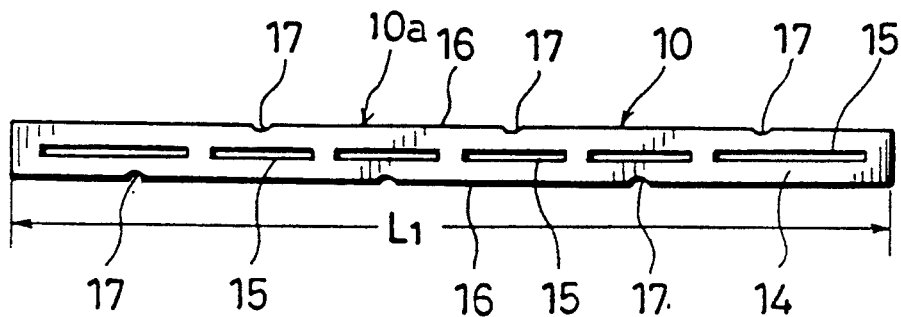
FIG. 3 is a plan view of the overall arrangement of the sealing mechanism of FIG. 1.
Figure 4:
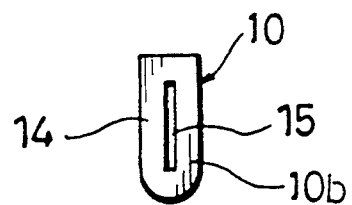
FIG. 4 is an elevational view of the overall arrangement of the sealing mechanism of FIG. 1.

Moreover, as shown in FIGS. 3 and 4, an outer surface 14 of the cap means (namely, the outer surfaces of the body portion 10a and the leg portions 10b, 10b) is uncontinuously formed with a plurality of longitudinal lubricating slots 15, and both side surfaces 16, 16 of the cap means 10 are respectively provided with a plurality of notches 17 at predetermined regular intervals of place.

Figure 1:
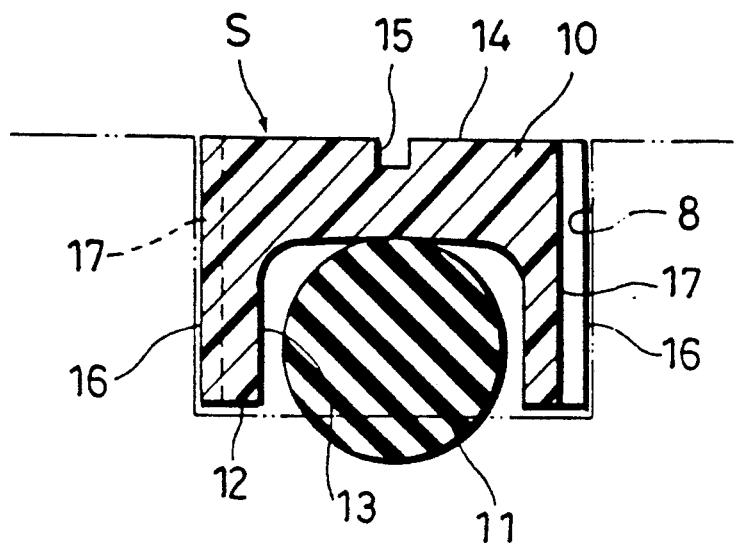
FIG. 1 is an enlarged sectional view of a sealing mechanism of the present invention according to a first embodiment thereof.

As shown in FIG. 3, the slots 15 are located centrally of the width of the cap means, and each slot is rectangular in the sectional shape thereof as shown in FIG. 1. The sectional shape of this slot may be square. Also, as an alternative arrangement, the longitudinal lubricating slots which are uncontinuously located may be replaced by a single continuous elongated slot (not shown).

Moreover, the notches 17 are semicircular in the sectional shape, and extend through the cap means 10 from the outer surface 14 of the cap means 10 to the inner surface 12 thereof. Also, in the positional relationship of the notches 17 with one another in the direction of the width of the cap means 10, the notches 17 are zigzag arranged, as illustrated in FIG. 3.

The resilient sealing body 11 is made from rubber, flexible plastics or any other suitable resilient material which is shaped in a sectional circular configuration. Also, in construction, the sealing body 11 comprises a linear body portion 11a and leg portions 11b, 11b protruded from the end portions of said body portion 11a, and the axes of the leg portions 11b, 11b intersect the axis of the body portion 11a perpendicularly (even in the free state of the sealing body).

In the free state of the resilient sealing body, the sealing body 11 is partially protruded from the inner surface 12 of the cap means 10, as illustrated in FIG. 1. Also, if the sectional area of the groove 13 and that of the resilient sealing body 11 are respectively represented by S1 and S2, the groove 13 and the sealing body 11 are arranged to allow both sectional areas to conform to the following formula.

$$(S2/S1) \times 100 \leqq 100$$

This is to say, the sectional area S1 of the groove 13 is equalized to or made greater than that S2 of the resilient sealing body 11. This decreases the permanent set of the sealing body 11, and increases the service life thereof. In this case, the length L1 of the cap means 10 (as best seen in FIG. 3) is set so as to be slightly greater than the length L2 of the groove 8 (as best seen in FIG. 6) in the free state of the sealing body.

With such an arrangement, if the sealing mechanism S is fitted into the groove 8, the resilient sealing body 11 is compressed, and as a result, the outer surface 14 of the cap means 10 is pressed into close contact with the outer circumferential surface 3 of the rotor 1 or the inner circumferential surface 5 of the casing 2. In addition, since the cap means 10 is formed in an overall sectional configuration of a cramp to assume a right-angled shape at each of the corner portions thereof, and the cap means 10 is arranged to have length L1 slightly greater than the length of the groove 8 in the free state of the cap means, the insertion of the sealing mechanism into the groove 8 compresses the cap means 10 longitudinally to thereby ensure the prevention of fluid leakage also at the corner portions 18, 18 of the groove 8. As a result, good sealed condition is retained between every two neighboring cylindrical chambers 7a, 7b, 7c, 7d.

Figure 7:
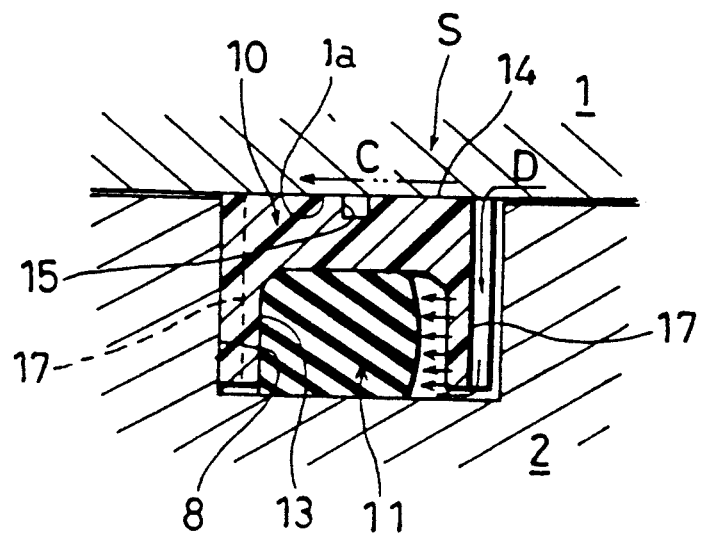
FIG. 7 is an enlarged sectional view which explains the operation of the sealing mechanism of FIG. 1.

In FIG. 7, if as a result of the exertion of some fluid pressure from, for example, the right hand side upon a cylindrical chamber, the working fluid is going to flow between the outer surface 14 of the cap means 10 and a sliding contact surface 1a of the rotor 1 therewith as shown by the arrow head C of an imaginary line, the fluid is caused to flow into the inserting groove 13 through the notch 17 as shown by the arrow head D. This presses the resilient sealing body 11 as shown by a plurality of other arrow heads, and allows the cap means 10 to be pressed in the direction of the outer surface 14 thereof owing to the resiliency of the sealing body 11, thereby preventing any ingress of the working fluid to the outer surface side of the cap means 10. Therefore, no trouble of "blow-by" occurs, and no fluid leakage takes place.

The longitudinal lubricating slots 15 of the outer surface 14 of the cap means 10 decreases the contact area of the outer surface 14 with the sliding contact surface 1a of the rotor 1, and enhances the contact surface pressure of the outer surface 14 with the sliding surface 1a of the rotor, to thereby improve the sealing capability of the sealing mechanism S according to the present invention. The slots 15 serve also as what is called oil pockets, and furnish the sliding contact surfaces of the cap means and the rotor against each other with an improved lubricating effect, whereby the outer surface 14 of the cap means 10 is decreased in wear or abrasion thereof, and the cap means 10 is enhanced in the durability or service life thereof. Also, in this first embodiment of the present invention, the lubricating slots 15 are arranged to be uncontinued, and for this reason, if one of the lubricating slots 15 undergoes fluid leakage, this fluid leakage does not influence another lubricating slot.

Figure 8:
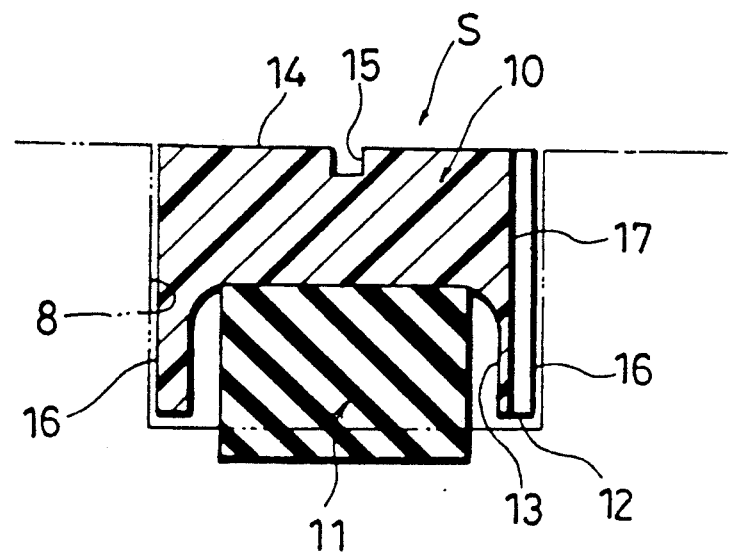
FIG. 8 is an enlarged sectional view of the sealing mechanism according to a second embodiment of the present invention.

FIG. 8 shows a modified example of the resilient sealing body 11, which is a second preferred embodiment of the present invention. In this embodiment, the resilient sealing body is formed in a rectangular sectional configuration, and is partially protruded from the inner surface 12 of the cap means 10 in the free state thereof. Also, the sealing body 11 and the groove 13 of the cap means 10 are arranged to allow the sectional area S1 of the groove 13 to be equal to or greater than that S2 of the resilient sealing body 11. This arrangement of the sealing mechanism S as shown in FIG. 8 will achieve the same operation and effect thereof as the sealing mechanism according to the preceding first preferred embodiment of the present invention.

Figure 9:
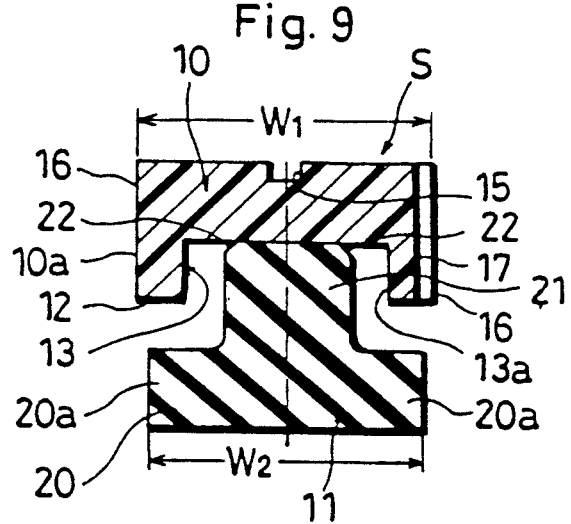
FIG. 9 is an enlarged sectional view of the body portion of the sealing mechanism according to a third embodiment of the present invention.
Figure 10:
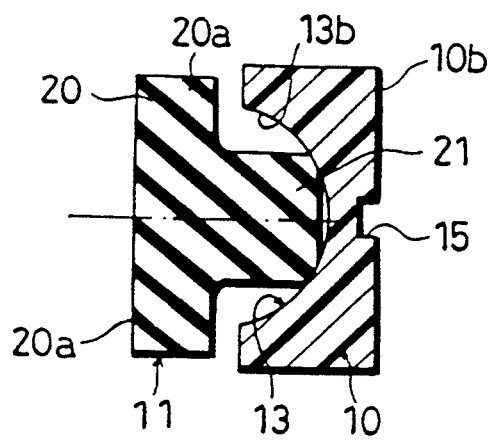
FIG. 10 is an enlarged sectional view of the leg portion of the sealing mechanism according to a fourth embodiment of the present invention.

FIGS. 9 and 10 show a third preferred embodiment of the present invention. In this third embodiment, the resilient sealing body 11 is formed in an inversely T-shaped sectional configuration. That is to say, the resilient sealing body 11 comprises a base portion 20 of a rectangular sectional configuration and a jutting portion 21 of a square sectional configuration which is protruded from the middle portion of the base portion 20. The base portion 20 is designed to be slightly smaller in the width W2 thereof than the width W1 of the cap means 10.

The jutting portion 21 is formed with chamferred portions 22, 22 on both top end portions thereof. In this case, the cross-sectional height compressibility of the resilient sealing body 11 is desired to be 21% to 31%, and the optimum values of such compressibility ranges between 23% and 28%.

Also, the groove 13 of the cap means 10 is formed with a rectangular portion 13a in the body portion 10a thereof as shown in FIG. 9, and is provided with a semicircular portion 13b in the leg portions thereof as shown in FIG. 10. This construction of the groove portion of the cap means 10 allows the groove portion to be simultaneously machined for this construction by means of an end mill or other similar machine. In two kinds of sealing mechanism as shown in FIGS. 1 to 4 and 8 and described with reference to these figures, the groove 13 of the leg portion 10b, 10b of each cap means may be also preferably formed with a semicircular portion.

Figure 11:
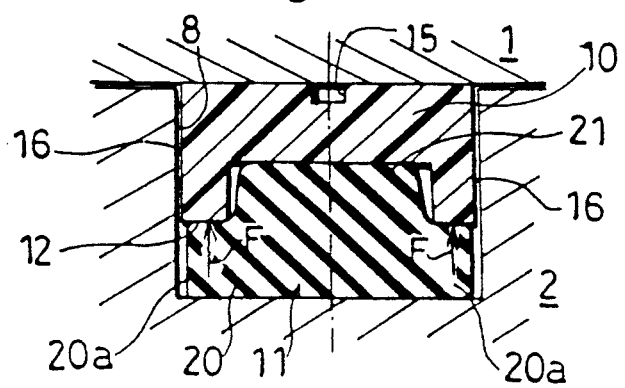
FIG. 11 is an enlarged sectional view of the sealing mechanism of the present invention which explains the operation thereof.
Figure 12:
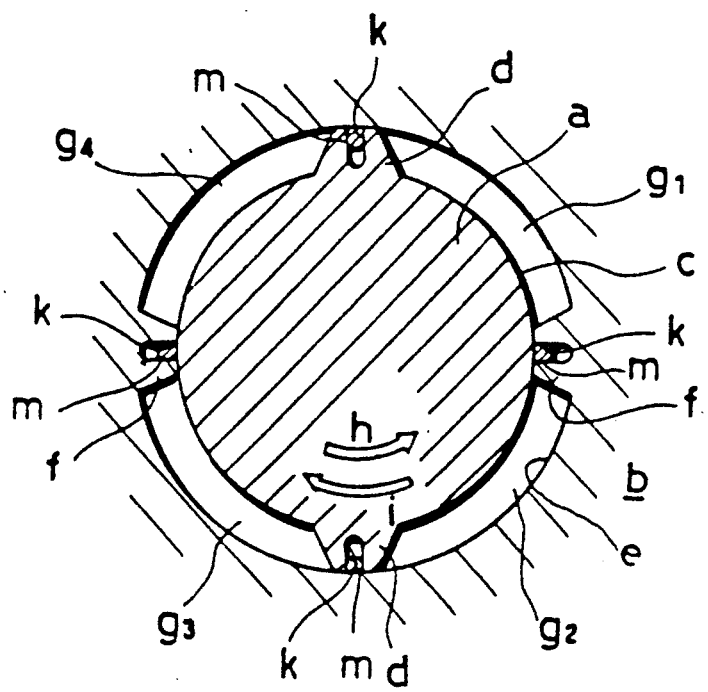
FIG. 12 is a sectional view of a rotary actuator in which the conventional seal is used.
Figure 13:
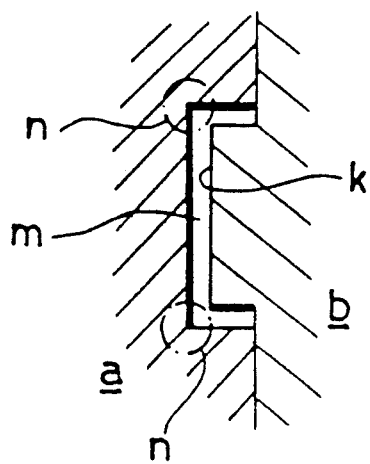
FIG. 13 is a sectional view of a principal portion of the rotary actuator of FIG. 12.

In the sealing mechanism as shown in FIGS. 9 and 10, the jutting portion 21 is so arranged in the sectional area thereof that end portions 20a, 20a of the base portion 20 of the resilient sealing body 11 are pressed into close contact with the inner surface 12 of the cap means 10 as shown FIG. 11 if the sealing mechanism is fitted into the groove 8. In the inserted condition of the sealing mechanism in the groove 8, therefore, the inner surface 12 of the cap means 10 is forced by means of the base portions 20 of the resilient sealing body 11 in the direction as shown by the arrow head F in FIG. 11, and the cap means 10 does not fall in the direction of the side surfaces 16, 16 thereof, whereby the sealing effect thereof becomes much superior.

In the effects of the present invention, each sealing mechanism arranged as shown and described in the foregoing for a rotary actuator has a superior lubricating effect upon the sliding surface of the rotor 1 and the cap means 10, because the longitudinal lubricating slots 15 made in the outer surface 14 of the cap means 10 function as what is called oil pockets. This decreases abrasion or wear of the outer surface 14 of the cap means 10, and lengthens the service life of the cap means 10. In the sealing mechanism according to the present invention, the longitudinal lubricating slots 15 also increase the contact surface pressure of the outer surface 14 with the mating sliding surface of the rotor 1, thereby achieving improvement in the sealing performance of the sealing mechanism.

Moreover, the provision of the notches 17 on the side surfaces 16, 16 of the cap means 10 prevent any occurrence of what is called blow-by, and therefore minimizes fluid leakage from a rotary actuator in which the sealing mechanism of the present invention is used.

Also, since the cap means 10 and the resilient sealing body 11 are formed in an overall sectional configuration of a cramp when they ace in a free state, the cap means 10 is capable of receiving also in both end portions thereof repulsive force of the resilient sealing body 11, and therefore, an extremely superior sealing function is also displayed in the corner portions 18, 18 of the groove 8.

As far as the notches 17 and the slots 15 are concerned, the following alternative construction may be applied.

The notches 17 may be located in the leg portions 10b of the cap means 10 instead of the side surfaces thereof. Also, the locating intervals of the notches and also the depth, width and number of the notches can be all freely changed. Moreover, the longitudinal lubricating slots 15 can also be changed in their locating intervals as well as their length, width and depth. Also, the sectional configuration of the slots 15 is not limited to a rectangle, and can be freely changed to a semicircle, a semi-ellipse or a polygon. However, if the slots 15 are formed in a rectangular configuration according to the foregoing embodiments of the present invention, the slots advantageously become greater in their oil reserving capacity. Also, the number of the longitudinal lubricating slots 15 can be freely altered.

Also, in the rotary actuator in which the sealing mechanism of the present invention is used, the rotor 1 may be fixed while on the other hand, the casing 2 may be correspondingly rotated.

Although the present invention has been fully described by way of examples with reference to the accompanying drawings, it is to be noted here that various changes and modifications will be apparent to those skilled in the art. Therefore, unless such changes and modifications otherwise depart from the scope of the present invention, they should be construed as being included therein.

We claim:

1. A sealing mechanism for a rotary actuator, comprising a cap means in an overall sectional configuration of a cramp and a resilient sealing body also in an overall sectional configuration of a cramp, said cap means comprising a body portion and two depending leg portions, the cap means having an inner surface defined by the surface of the body portion between the leg portions and surfaces of the leg portions continuous with the surface of the body portion, a plane-shaped outer surface opposed to the inner surface, and two plane-shaped side surfaces between the inner surface and the outer surface, the inner surface of the cap means including an inserting groove into which the sealing body is fitted with a part of the sealing body protruding from said inner surface of the cap means, the plane-shaped outer surface of the cap means having longitudinal lubricating slots, and both of the plane-shaped side surfaces of the cap means respectively having a plurality of notches which extend from the outer surface of the cap means to the inner surface of the cap means.

2. A sealing mechanism for a rotary actuator, as set forth in claim 1, wherein the cap means is made from a resin selected from the group consisting of fluorocarbon resins, polyacetal resins, and polyamide resins, and polyethylene resins of super high molecular weight.

3. A sealing mechanism for a rotary actuator, as set forth in claim 1, wherein the resilient sealing body is made from an elastic material, selected from the group consisting of rubbers and flexible plastics.

4. A sealing mechanism for a rotary actuator, as set forth in claim 1, wherein a plurality of longitudinal lubricating slots are uncontinuously provided.

5. A sealing mechanism for a rotary actuator, as set forth in claim 1, wherein the longitudinal lubricating slots are rectangular in cross sectional configuration.

6. A sealing mechanism for a rotary actuator, as set forth in claim 1, wherein the notches are located on both plane-shaped side surfaces of the cap means in an offset relationship.

7. A sealing mechanism for a rotary actuator, as set forth in claim 1, wherein the resilient sealing body is circular in the cross sectional configuration thereof.

8. A sealing mechanism for a rotary actuator, as set forth in claim 1, wherein the resilient sealing body is rectangular in the cross sectional configuration thereof.

9. A sealing mechanism for a rotary actuator, as set forth in claim 1, wherein the resilient sealing body has an inversely T-shaped configuration having a base portion and a jutting portion wherein a width W1 of the cap means is larger than a width W2 of the base portion of the resilient sealing body and the width of the jutting portion is smaller than the width of the groove of the cap means.

10. A sealing mechanism for a rotary actuator, as set forth in claim 1, wherein the inserting groove of the cap means is rectangular in the cross sectional configuration thereof.

11. A sealing mechanism for a rotary actuator, as set forth in claim 1, wherein the inserting grooves in leg portions of the cap means are semicircular in their cross sectional configurations.

12. A sealing mechanism for a rotary actuator, as set forth in claim 1, wherein the relationship between the sectional area S1 of the inserting groove of the cap means and that sectional area S2 of the resilient sealing body conforms to the formula $(S1/S2 \times 100 \leqq 100$.

* * * * *